Oct. 26, 1965  D. ARONSON ETAL  3,214,100
LOADING AND DRIVE SYSTEMS FOR HEAT PUMPS
Filed Dec. 26, 1961  2 Sheets-Sheet 1

DAVID ARONSON
RICHARD E. JAPHET
INVENTORS

# United States Patent Office 3,214,100
Patented Oct. 26, 1965

3,214,100
LOADING AND DRIVE SYSTEMS FOR
HEAT PUMPS
David Aronson, Upper Montclair, N.J., and Richard E.
Japhet, New York, N.Y., assignors to Worthington Corporation, Harrison, N.J., a corporation of Delaware
Filed Dec. 26, 1961, Ser. No. 161,789
7 Claims. (Cl. 237—12.1)

This invention relates to a heating system for an enclosed area and more particularly contemplates means for association with a heat pump system so that the total energy input is not limited by low ambient temperatures.

Prior type heat pump systems suffer from a loss of capacity with a decrease in heat source temperature because the pressure of the working substance decreases with a drop in temperature. This leads to a lower density of the fluid going to the compressor. Since the compressor generally has a fixed or limited volume handling capacity, the mass of working substance which is compressed is reduced. As a consequence the load on the motor or driving means for the compressor is also reduced. This may further aggravate the problem of providing heating at times of low heat source temperature. In heat pump systems using the outdoor air as a heat source, the drop in temperature usually occurs at the same time as the demand for heat is likely to be greatest. This limitation may be overcome by designing the system so that it is oversized and accordingly the machinery can be operated at very light loads during periods of moderate temperature and at full rating during periods of very low outdoor temperatures. Such systems usually prove to be uneconomical and as a consequence oversizing in the art is avoided by providing a supplementary heating means.

In heat pump systems driven by engines of the combustion type it is common practice to utilize a portion of the rejected heat as a means for increasing the economy of the heating system. However, these systems also suffer from the limitation of reduced capacity at times of low ambient temperature because of the reduced load on the engine as was described hereinabove. This reduced load leads to a low rate of burning fuel and a lower quantity of heat to be rejected. As a result there is still a reduction of the total output of the combined sources of heat, the heat pump itself and the waste heat of the prime mover. In systems of this kind as was mentioned above supplementary heat can be supplied by a supplementary furnace or some sort of electrical resistance type heater.

The present invention contemplates means for increasing the load on the engine or prime mover of the system so that it operates at full capacity even though the compressor load falls off as a consequence of low ambient temperature. The supplementary load is not required to perform useful mechanical work and may be broadly termed a brake, whether or not the actual structure is in the form of equipment generally designated as a brake. The heat produced by such braking, as well as the heat rejected by the engine by virtue of its operating at a load greater than called for by the compressor, can now be made available to the areas to be heated by the heating system.

It is ponted out that inclusion of a braking means as is contemplated herein in the systems described hereinabove eliminates the need for supplying a source of heat from an additional heating source other than the heat pump system.

In one version of the present invention the braking means comprises a restriction placed in the hydraulic circuit comprising a pump connecting lines and control and a hydraulic motor driving a fan spaced relative the evaporator.

In another embodiment a hydraulic brake which can be selectively adjusted to provide a heating source as required by demands of the space to be heated is imposed in the circuit flowing from the condenser to the space to be heated.

It is an object of the present invention to provide means whereby the heating operation of a heating system of the heat pump type can be carried on during periods of extremely cold weather without the use of external heat sources such as electrical resistance heating elements or the like and as a consequence increase the normal output of the heat pump in such fashion as to compensate for the decreased capacity associated with low suction pressures so that the heat pump system can operate at full rated output or any part of that output as most suitably meets the system heating requirements.

Other objects and advantages of the invention including the basic design and the nature of the improvements thereon will appear from the following description taken in conjunction with the following drawings, in which.

Figure 1:
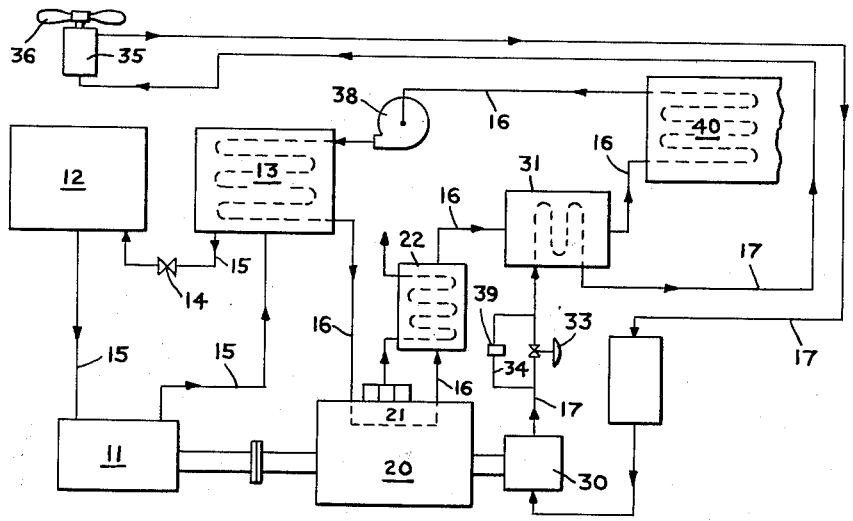
FIGURE 1 shows one form of the loading and drive system contemplated herein.

The invention shown diagrammatically in the drawings will be described as part of a heat pump system wherein the source of heat, generally the outside air, is likely to vary in temperature thus decreasing the heat pumping capability of the system but it is to be understood that the invention is equally applicable to heat pumps for process work where the evaporating pressure may be varied.

Referring now to FIGURE 1 of the drawings, the heating system contemplated herein provides heat from two sources; the heat pump itself which comprises a compressor 11, an evaporator 12, a condenser 13, an expansion valve 14 all provided with conduit means generally designated 15 which connect the elements in flow circuit relation. A driving means 20 shown in the apparatus of FIGURE 1 as an engine of the combustion type is connected to the compressor to cause same to circulate fluid medium through the elements connected to the compressor. Heating medium is passed through a second circuit to the enclosed area 40 and this second circuit comprises a series of heat absorbers, that is, coolers including the engine jacket cooling system 21, a heat exchanger 22 connected to the exhaust of the engine to recover a portion of the heat in the exhaust and an oil cooler 31 also serving as a heat exchager. A second conduit means 16 interconnects the condenser 13, means for absorbing rejected engine heat 21, heat exchangers 22 and 31, the enclosed area 40 in fluid circuit relation. A pump 38 shown as disposed between the enclosed area 40 and condenser 13 is incorporated into the second conduit means to circulate water or other suitable fluid through the condenser where it causes the working fluid of the heat pump to condense and by absorbing this heat of condensation the water or like circulating in the second conduit means is heated. The water or heating medium flowing in the second circuit 16 then flows through the engine jackets 21 where it is heated further, then through the waste heat exchanger 22 where additional heat available from the engine exhaust gases is recovered and finally to the heat exchanger 31 where the heating medium or water is heated to the temperature required for heating the enclosed area 40.

It is not intended to limit the exact sequence of these heating operations as they are not critical and it will be understood by one skilled in the art that these sequences may be varied in accordance with the cooling requirements of the particular components being cooled or in order to obtain other advantages in terms of cost of heat transfer equipment, avoidance of corrosion in the waste heat exchanger, or for other considerations not germane to the nature of the advance contemplated herein.

In order to provide means for increasing the heat source supplied to the enclosed area 40, when the compressor load falls off applicant provides in the embodiment shown in FIGURE 1 a pumping means designated 30 which serves as a driving system for auxiliaries such as the fan 36 spaced relative the evaporator 12. A hydraulic motor of a well known type 35 is connected into the third conduit means which is also connected to the pump 30. It is the modification of this system which permits a simple method of applying an additional working load on the engine when the compressor load decreases because of lowered heat source temperature. In addition to the pump 30 the hydraulic power transmission system for the auxiliaries of the heating system includes the heat exchanger or cooler 31 and reservoir 32. A bypass means 34 including a restriction 39 is disposed in the third conduit means generally designated 17 and preferably between the pumping means 30 and the heat exchanger or cooler 31. Valve 33 is disposed in the conduit means 17 and upon manipulation thereof the fluid passing out of the outlet of the pump means 30 is caused to pass through the restriction 39.

During normal operation with moderate ambient temperature providing a sufficiently high pressure in the evaporator 12 to fully load the engine 20 and to further provide the desired heat to the enclosed area 40, valve 33 is open wide and fluid flows through both the valve 33 and the orifice or restriction 39. When a drop in ambient temperature is sensed to such a level that the system cannot meet the heat requirement for conditioning the enclosed area 40 the valve 33 is closed partially or completely so as to restrict the flow of hydraulic fluid flowing through the third conduit means 17. Since the pump 30 which is of the positive displacement type is required to pump against a greater head imposed by the restriction 39 the effect is to raise the pressure at the discharge of the pump. This causes a concomitant increase in the power required by the pump and therefore imposes an additional load on the engine 20. The heat represented by this artificial loading is absorbed by the heat exchanger 31 and thus additional heat is transferred from the third conduit means to the second conduit means as they pass in heat exchange relation in the heat exchanger 31. Furthermore, the increased load on the engine 20 due to the additional artificial loading imposed thereon due to the driving requirements of the pump 30 provides for an increase in fuel consumption in the engine and thereby increases the heat available from the means for absorbing the engine heat 21 and in the exhaust gases. The combined effect is to increase the capacity of the system beyond that of conventional systems without the necessity of incorporating auxiliary heating units such as furnaces and the like.

Figure 2:
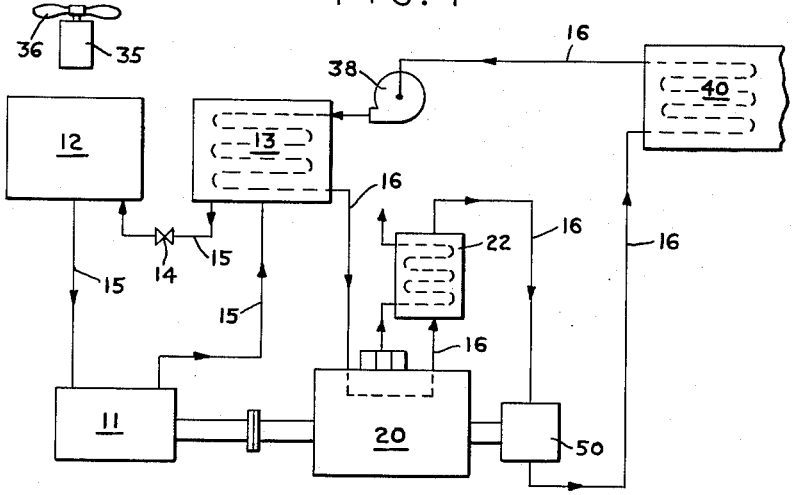
FIGURE 2 shows a modified arrangement of the loading and drive system shown in FIGURE 1.

FIGURE 2 shows a modified form of the loading and drive system shown in FIGURE 1 and functions in similar fashion to the system described shown and described in FIGURE 1.

Those parts having generally the same construction and purpose as the corresponding parts in FIGURE 1 have been given the same reference characters.

Referring to FIGURE 2 instead of utilizing a hydraulic system for driving the fan 36 spaced relative the evaporator 12 a motor 35 of any well known type is used for this purpose. Instead of a pump as was called for in FIGURE 1 it is now contemplated that a braking means 50 be coupled to the engine or turbine 20. The braking means of any well known type available commercially and commonly used for the purpose of testing engines includes means which permit varying the loading from zero to full capacity of the brake. In this manner any desired degree of work can be imposed on the engine by simply regulating the brake in accordance with these requirements. In this fashion applicant eliminates the circuit in FIGURE 1 comprising a third conduit means and the elements connected therein and passes heating medium from the heat exchanger 22 through the braking means prior to passing the heating medium to the enclosed area 40.

In this fashion in the event that there is a drop in ambient temperature a supply of heat is furnished by the braking means to supplement that lost due to the drop in ambient temperature. It is evident then that conduit 16 will be, that is the fluid flowing in this conduit, heated as a result of passing same in heat exchange relation through the brake 50 prior to passing the heating medium to the enclosed area 40.

It is pointed out that the arrangement of heat exchangers in an engine driven or turbine driven heat pump heating system is well known to those versed in the art. The general scheme of such heat recovery supplementing that available from the heat pump itself is advantageous in that effective use is made of the major portion of the heat supplied to the system in the form of fuel. The energy that would formerly be discarded as occurs when heat is converted to mechanical power in a location remote from the operation of the heat pump as in electrically powered systems is effectively recovered by means of auxiliary heat exchangers when the prime mover is directly associated as the driver of the heat pump. During periods of mild weather, the coefficient of performance of the heat pump portion of the system is likely to be high, in the order of 300%, so that the overall quantity of heat delivered to the conditioning space of enclosed area 40 may be greater than the equivalent heat supplied by the fuel. This system may therefore be considered to have an efficiency greater than 100% as compared with the efficiency of a direct fuel fired furnace.

As the heat source temperature falls, the coefficient of performance of the heat pump falls. This in itself is not a serious consequence but as was mentioned hereinabove is associated with a decrease in heat pumping capacity. According to this invention and when the capacity of a system becomes inadequate to meet the demand for heat, the braking load is applied to the engine to bring this load beyond that imposed by the compressor of the heat pump. Generally it will be desirable to run the engine at full speed under these conditions, but it may be run at full rated torque or some lesser value depending on the preferred mode of operating the heating system. With an on-off type of control generally the engine will be made to operate at full rated torque when the braking load is applied. The brake in the embodiment shown in FIGURE 2 serves to supply heat by passing conduit 16 therethrough from the operation of the brake itself and from the added heat rejected in the engine water jacket or means for absorbing rejected engine heat 21 and the heat exchanger connected to the engine exhaust to recover heat from the exhaust gases being discharged.

Figure 3:
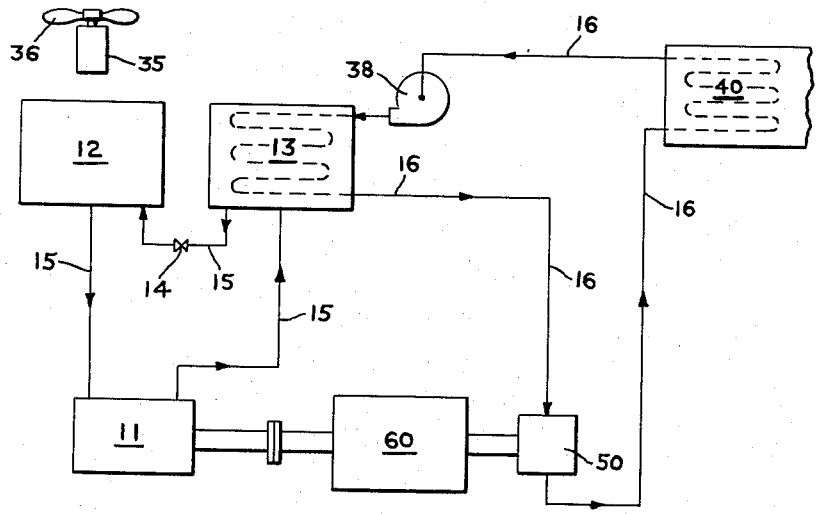
FIGURE 3 shows a further modified arrangement of the loading and drive system contemplated herein.

FIGURE 3 shows a further modified arrangement wherein like parts corresponding to FIGURE 1 have been given the same reference numerals.

Instead of an engine or driving means of the combustion type as was contemplated in FIGURES 1 and 2 applicant utilizes an electric motor 60 as the driving means in the embodiment shown in FIGURE 3.

In this particular arrangement the means for absorbing rejected heat from the engine and from the engine exhaust are eliminated and heating medium from the condenser is passed directly through the braking means 50 by means of conduit 16 to recover heat generated in the braking means prior to passing this heating medium to the enclosed area 40.

In the embodiment contemplated in FIGURE 3 the augmented capacity is less than in the case of the embodiments shown in FIGURES 1 and 2 because the heat rejected by the prime mover at the generating station is not available to the heat pump system.

However, some systems are not suited for use with driving means of the combustion type and as a consequence the advantages of the advance contemplated herein can be as easily adapted to a system requiring an electric driving means as is described and shown in connection with FIGURE 3.

Although this invention has been described with reference to specific apparatus it will be appreciated that a wide variety of changes may be made within the ability of one skilled in the art without departing from the scope of this invention. For example, some of the components of the apparatus may be reversed, certain features of the invention may be used independently of others and equivalents may be substituted for the apparatus, all within the spirit and scope of the invention as defined in the appended claims.

What is claimed is:

1. A heat pump system for heating an enclosed area comprising:
   (a) a heat pump loop means having a compressor, a condenser, an expansion device, and an evaporator operatively connected to each other,
   (b) the evaporator in communication with a heat sink source,
   (c) a prime mover connected to drive the compressor,
   (d) braking means connected to the prime mover and to operate responsive to the temperature of the heat sink media to selectively provide a source of heat according to the heating requirements of the enclosed area,
   (e) a second loop means including at least one heat exchanger in the enclosed area, and
   (f) conduit means operatively connected between the condenser of the heat pump loop means, the braking means and the heat exchangers whereby the enclosed area will be selectively heated.

2. The combination claimed in claim 1 wherein:
a fluid circulating means disposed in the last mentioned conduit means to provide forced circulation therein.

3. The combination claimed in claim 2 wherein:
the braking means comprises a hydraulic fluid brake.

4. A heating system for heating an enclosed area comprising;
   (a) a compressor,
   (b) a condenser,
   (c) an expansion device,
   (d) an evaporator disposed in communication with a heat sink source,
   (e) a first conduit means interconnecting the compressor, the condenser, the expansion device and the evaporator to form a heat pump loop means,
   (f) driving means connected to drive the compressor,
   (g) braking means connected to the driving means and the braking means selectively adjustable to provide a source of heat responsive to the demands of the heating system,
   (h) a plurality of heat exchangers disposed in the enclosed area,
   (i) a second conduit means interconnecting the condenser, the braking means and the plurality of heat exchangers to form a second loop means whereby the enclosed area may be selectively heated.

5. The combination claimed in claim 4 wherein:
the driving means is of the combustion type.

6. The combination claimed in claim 5 wherein:
   (a) a heat exchange means disposed in communication with the exhaust of the driving means for absorbing rejected heat therefrom,
   (b) the heat exchange means disposed in indirect heat exchange relationship to the second loop means whereby the rejected heat will be transferred to said loop means.

7. The combination claimed in claim 6 wherein:
   (a) a pump is disposed in the conduit means of the second loop means to provide forced circulation therein,
   (b) the braking means comprising a hydraulic fluid brake.

References Cited by the Examiner

UNITED STATES PATENTS

| | | | |
|---|---|---|---|
| 2,797,068 | 6/57 | McDarland | 165—29 |
| 2,846,148 | 8/58 | Dilworth et al. | 165—42 X |

CHARLES SUKALO, *Primary Examiner.*